(12) United States Patent
Liu et al.

(10) Patent No.: US 12,342,295 B2
(45) Date of Patent: Jun. 24, 2025

(54) METHOD AND DEVICE FOR REPORTING INFORMATION BASED ON CARRIER AGGREGATION AND STORAGE MEDIUM

(71) Applicant: CHINA TELECOM CORPORATION LIMITED, Beijing (CN)

(72) Inventors: Bo Liu, Beijing (CN); Shan Yang, Beijing (CN); Jianchi Zhu, Beijing (CN); Xiaoming She, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 18/578,043

(22) PCT Filed: Jul. 11, 2022

(86) PCT No.: PCT/CN2022/104847
§ 371 (c)(1),
(2) Date: Jan. 10, 2024

(87) PCT Pub. No.: WO2023/045500
PCT Pub. Date: Mar. 30, 2023

(65) Prior Publication Data
US 2024/0323866 A1    Sep. 26, 2024

(30) Foreign Application Priority Data
Sep. 27, 2021  (CN) .......................... 202111136875.0

(51) Int. Cl.
*H04W 52/36* (2009.01)
*H04W 52/32* (2009.01)
*H04W 52/34* (2009.01)

(52) U.S. Cl.
CPC ......... *H04W 52/367* (2013.01); *H04W 52/32* (2013.01); *H04W 52/34* (2013.01); *H04W 52/365* (2013.01)

(58) Field of Classification Search
CPC ... H04W 52/367; H04W 52/32; H04W 52/34; H04W 52/365
See application file for complete search history.

(56) References Cited

U.S. PATENT DOCUMENTS

2010/0158147 A1   6/2010 Zhang et al.
2011/0310781 A1*  12/2011 Kim ...................... H04L 5/0046
                                                        370/328

(Continued)

FOREIGN PATENT DOCUMENTS

CN    102083131 A    6/2011
CN    102088760 A    6/2011

(Continued)

OTHER PUBLICATIONS

Notice of Allowance for CN Patent Application No. 2021111368750.

(Continued)

*Primary Examiner* — John J Lee
(74) *Attorney, Agent, or Firm* — Perilla Knox & Hildebrandt LLP; Kenneth A. Knox

(57) ABSTRACT

A method and device for reporting information based on carrier aggregation and a non-transitory computer-readable storage medium are provided. The method includes: determining a first maximum output power of each of carriers in a carrier aggregation scenario when being used as a single carrier; determining a second maximum output power, in the carrier aggregation scenario, of each of the carriers; and reporting, in response to detecting that there is a target carrier with the first maximum output power larger than the second maximum output power in the carrier aggregation scenario, a power class corresponding to the second maximum output power of the target carrier to a base station.

20 Claims, 5 Drawing Sheets

(56) References Cited

U.S. PATENT DOCUMENTS

| | | | |
|---|---|---|---|
| 2012/0033470 A1* | 2/2012 | Muneshima | H02M 7/219 363/123 |
| 2013/0070874 A1* | 3/2013 | Nakagawa | H04B 10/6164 375/334 |
| 2017/0318599 A1 | 11/2017 | Caretti et al. | |
| 2019/0200305 A1* | 6/2019 | Kazmi | H04W 52/365 |
| 2019/0239168 A1* | 8/2019 | Li | H04W 52/248 |
| 2020/0053659 A1 | 2/2020 | Wang et al. | |
| 2020/0205089 A1 | 6/2020 | Kim et al. | |
| 2020/0374808 A1 | 11/2020 | Zhang et al. | |
| 2021/0099960 A1 | 4/2021 | Haim et al. | |

FOREIGN PATENT DOCUMENTS

| | | |
|---|---|---|
| CN | 102742193 A | 10/2012 |
| CN | 108306718 A | 7/2018 |
| CN | 110381576 A | 10/2019 |
| EP | 2521279 B1 | 2/2015 |
| EP | 3352508 A1 | 7/2018 |
| JP | 2016189608 A | 11/2016 |
| JP | 2017069962 A | 4/2017 |
| WO | 2015041319 A1 | 3/2015 |

OTHER PUBLICATIONS

International Search Report for International Application No. PCT/CN2022/104847.

Research on 5G Carrier Aggregation, Double Connection and Early Measurement Report Technology. https://www.doc88.com/p-47316902100813.html (Last visited: Sep. 4, 2024).

First Office Action for JP Patent Application No. 2023-580394 of Jun. 11, 2024.

Extended European Search Report for EP Patent Application No. 22871559.5.

* cited by examiner

METHOD AND DEVICE FOR REPORTING INFORMATION BASED ON CARRIER AGGREGATION AND STORAGE MEDIUM

CROSS-REFERENCE TO RELATED APPLICATIONS

The present application is a national stage application under 35 U.S.C. § 371 of International Application No. PCT/CN2022/104847 filed on Jul. 11, 2022, which is based on and claims the benefit of and priority to Chinese Patent Application No. 202111136875.0, filed on Sep. 27, 2021, the contents of which are incorporated by reference in their entireties herein.

TECHNICAL FIELD

The present disclosure relates to the field of communication technology, and in particular, to a method for reporting information based on carrier aggregation, a device for reporting information based on carrier aggregation, a computer-readable storage medium, and an electronic device.

BACKGROUND

With the continuous development of communication technology, there are more and more classifications for the power class of a high-power terminal device. However, the terminal device generally only reports the total power class in the carrier aggregation scenario.

It is to be noted that the above information disclosed in the Background section is only for enhancement of understanding of the background of the present disclosure and therefore it may contain information that does not form the prior art that is already known to a person skilled in the art.

BRIEF SUMMARY

Other features and advantages of the present disclosure will become apparent by the following detailed description, or will be acquired, in part, by the practice of the present disclosure.

An aspect of the present disclosure provides a method for reporting information based on carrier aggregation, including:
  determining a first maximum output power of each of carriers in a carrier aggregation scenario when being used as a single carrier;
  determining a second maximum output power, in the carrier aggregation scenario, of each of the carriers; and
  reporting, in response to detecting that there is a target carrier with the first maximum output power larger than the second maximum output power in the carrier aggregation scenario, a power class corresponding to the second maximum output power of the target carrier to a base station.

In some embodiments, reporting the power class corresponding to the second maximum output power of the target carrier to the base station includes:
  generating first indication information including a carrier identification field and a power class field, wherein the carrier identification field is configured to indicate at least an identification corresponding to the target carrier, and the power class field is configured to indicate at least the power class corresponding to the second maximum output power of the target carrier; and
  transmitting the first indication information to the base station.

In some embodiments, the method further includes, after transmitting the first indication information to the base station:
  updating, by the base station, a power class corresponding to the first maximum output power of the target carrier, to the power class corresponding to the second maximum output power of the target carrier.

In some embodiments, the method further includes:
  reporting, in response to detecting that there is no target carrier with the first maximum output power larger than the second maximum output power in the carrier aggregation scenario, second indication information including the carrier identification field; and
  transmitting the second indication information to the base station, so that the base station determines, in response to detecting that there is a default field in the second indication information, that there is no power class update indication.

In some embodiments, the method further includes:
  reassigning, in response to receiving a carrier assignment instruction, transmitting channels corresponding to the carriers, so that the transmitting channels correspond to the carriers in a one-to-one correspondence; and
  performing carrier aggregation on the carriers and determining that the carriers are in the carrier aggregation scenario.

In some embodiments, the method further includes:
  uploading, in response to determining that there is uplink data, the uplink data to the base station at an output power less than or equal to the second maximum output power of the target carrier.

In some embodiments, the carriers are intra-band contiguous, intra-band non-contiguous or inter-band non-contiguous.

In some embodiments, reporting the power class corresponding to the second maximum output power of the target carrier to the base station includes:
  determining at least one cell to which a terminal device belongs, and determining a base station corresponding to each of the at least one cell; and
  reporting the power class corresponding to the second maximum output power of the target carrier to the base station corresponding to each of the at least one cell.

In some embodiments, the method further includes:
  transmitting, in response to detecting that there is no target carrier with the first maximum output power larger than the second maximum output power in the carrier aggregation scenario, third indication information to the base station, wherein the third indication information does not include a carrier identification field or a power class field.

In some embodiments, the method further includes:
  determining, by the base station, not to update the power classes corresponding to the carriers according to the third indication information.

In some embodiments, in the carrier aggregation scenario, each of the carriers corresponds to one transmitting channel, and in a single carrier scenario, each of the carriers corresponds to one or more transmitting channels.

In some embodiments, the base station is at least one of a 3G base station, a 4G base station, a 5G base station, and a 6G base station.

In some embodiments, a terminal device transmitting the carriers applies a time division duplex TDD mode.

In some embodiments, the carrier aggregation scenario includes a carrier aggregation scenario in 4G and 5G dual connectivity.

An aspect of the present disclosure provides a device for reporting information based on carrier aggregation, including:
- a power determining unit, configured to determine a first maximum output power of each of carriers in a carrier aggregation scenario when being used as a single carrier;
- the power determining unit, further configured to determine a second maximum output power, in the carrier aggregation scenario, of each of the carriers; and
- an information reporting unit, configured to report, in response to detecting that there is a target carrier with the first maximum output power larger than the second maximum output power in the carrier aggregation scenario, a power class corresponding to the second maximum output power of the target carrier to a base station.

In some embodiments, the information reporting unit is configured to:
- generate first indication information including a carrier identification field and a power class field, wherein the carrier identification field is configured to indicate at least an identification corresponding to the target carrier, and the power class field is configured to indicate at least the power class corresponding to the second maximum output power of the target carrier; and
- transmit the first indication information to the base station.

In some embodiments, the information reporting unit is configured to, after transmitting the first indication information to the base station, update, by the base station, a power class corresponding to the first maximum output power of the target carrier, to the power class corresponding to the second maximum output power of the target carrier.

In some embodiments, the information reporting unit is further configured to:
- report, in response to detecting that there is no target carrier with the first maximum output power larger than the second maximum output power in the carrier aggregation scenario, second indication information including the carrier identification field; and
- transmit the second indication information to the base station, so that the base station determines, in response to detecting that there is a default field in the second indication information, that there is no power class update indication.

In some embodiments, the device further includes:
- a channel assigning unit, configured to reassign, in response to receiving a carrier assignment instruction, transmitting channels corresponding to the carriers, so that the transmitting channels correspond to the carriers in a one-to-one correspondence; and perform carrier aggregation on the carriers and determine that the carriers are in the carrier aggregation scenario.

In some embodiments, the method further includes:
a data uploading unit, configured to upload, in response to determining that there is uplink data, the uplink data to the base station at an output power less than or equal to the second maximum output power of the target carrier.

In some embodiments, the carriers are intra-band contiguous, intra-band non-contiguous or inter-band non-contiguous.

In some embodiments, the information reporting unit is configured to:
- determine at least one cell to which a terminal device belongs, and determine a base station corresponding to each of the at least one cell; and
- report the power class corresponding to the second maximum output power of the target carrier to the base station corresponding to each of the at least one cell.

An aspect of the present disclosure provides an electronic device including a processor and a memory storing executable instructions of the processor, and the processor is configured to implement any one of the methods described above by executing the executable instructions.

An aspect of the present disclosure provides a computer-readable storage medium having computer programs stored thereon that, when being executed by a processor, implement any one of the methods described above.

An aspect of the present disclosure provides a computer program product or a computer program including computer instructions, and the computer instructions are stored in a computer-readable storage medium. A processor of a computer device reads the computer instructions from the computer-readable storage medium, and the processor executes the computer instructions, so that the computer device implements the method provided in the above various optional embodiments.

Other features of the present disclosure and advantages thereof will become clear by the following detailed description of embodiments of the present disclosure with reference to the accompanying drawings.

BRIEF DESCRIPTION OF THE DRAWINGS

The accompanying drawings illustrated herein are used to provide a further understanding of the present disclosure and form part of the present disclosure, and exemplary embodiments of the present disclosure and the description thereof are configured to explain the present disclosure and do not constitute an undue limitation of the present disclosure.

DETAILED DESCRIPTION

Figure 1:
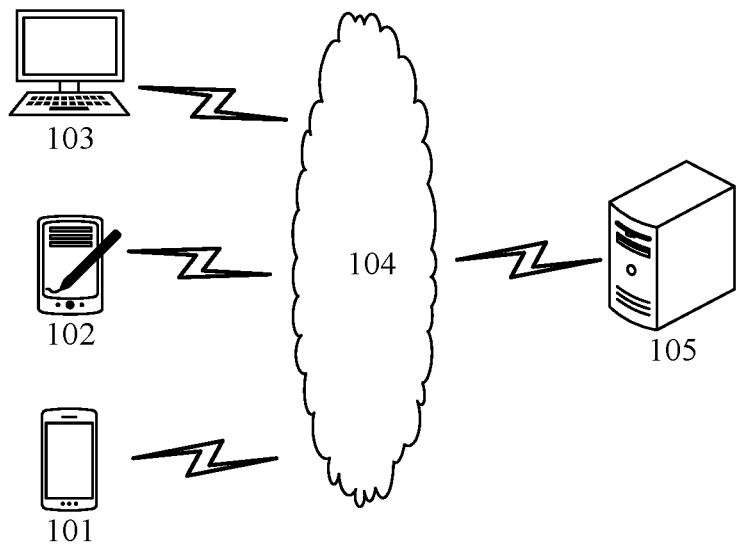
FIG. 1 illustrates a schematic diagram of an exemplary system architecture to which a method for reporting information based on carrier aggregation and a device for reporting information based on carrier aggregation according to an embodiment of the present disclosure may be applied.

Example embodiments will now be described more fully with reference to the accompanying drawings. However, the example embodiments can be implemented in a variety of forms and should not be construed as being limited to the embodiments set forth herein. Rather, these embodiments are provided so that the present disclosure is comprehensive and complete and the concept of the example embodiments is conveyed to a person skilled in the art comprehensively. The described features, structures or characteristics may be combined in one or more embodiments in any suitable manner. In the following description, many specific details are provided, thereby giving a full understanding of the embodiments of the present disclosure. However, a person skilled in the art will realize that the technical solution of the present disclosure may be practiced without one or more of the particular details described, or by using other methods, components, devices, steps or the like. In other instances, the well-known technical solutions are not shown or described in detail to avoid overshadowing and obscuring aspects of the present disclosure.

Furthermore, the accompanying drawings are only schematic illustrations of the present disclosure and are not necessarily drawn to scale. The same reference numerals in the drawings indicate identical or similar parts, and thus repetitive descriptions thereof will be omitted. Some of the block diagrams shown in the accompanying drawings are functional entities and do not necessarily have to correspond to physically or logically separate entities. These functional entities may be implemented in software form, or in one or more hardware modules or integrated circuits, or in different networks and/or processor devices and/or microcontroller devices.

It was found that the terminal only reports the total power class in the carrier aggregation scenario, which is not representative of the maximum output power of each carrier in the carrier aggregation, which may easily lead to an error in the maximum output power class of each carrier in the carrier aggregation recorded by the base station.

FIG. 1 illustrates a schematic diagram of a system architecture of an exemplary application environment to which a method for reporting information based on carrier aggregation and a device for reporting information based on carrier aggregation according to an embodiment of the present disclosure may be applied.

As shown in FIG. 1, a system architecture 100 may include one or more of terminal devices 101, 102, 103, a network 104, and a server 105. The network 104 is used to provide a medium for a communication link between the terminal devices 101, 102, 103, and the server 105. The network 104 may include various connection types, such as wired or wireless communication links, or fiber-optic cables. The terminal devices 101, 102, 103 may be a variety of electronic devices having a display, including, but not limited to, desktop computers, portable computers, smartphones, tablets, or the like. It should be understood that the number of terminal devices, networks, and servers in FIG. 1 is merely representative. There may be any number of terminal devices, networks, and servers as needed for implementation. For example, the server 105 may be a server cluster including a plurality of servers, and the like.

The method for reporting information based on carrier aggregation according to an embodiment of the present disclosure is generally performed by the server 105, and accordingly, the device for reporting information based on carrier aggregation is generally provided in the server 105. However, a person skilled in the art may understand that the method for reporting information based on carrier aggregation according to an embodiment of the present disclosure may also be performed by the terminal device 101, 102, or 103, and accordingly, the device for reporting information based on carrier aggregation may also be provided in the terminal device 101, 102, or 103, which is not specifically limited in the embodiment of the present disclosure.

By way of example, in an embodiment, the server 105 may determine a first maximum output power of each of the carriers in a carrier aggregation scenario when being used as a single carrier; determine a second maximum output power, in the carrier aggregation scenario, of each of the carriers; and report, if it is detected that there is a target carrier with the first maximum output power larger than the second maximum output power in the carrier aggregation scenario, a power class corresponding to the second maximum output power of the target carrier to a base station.

Figure 2:
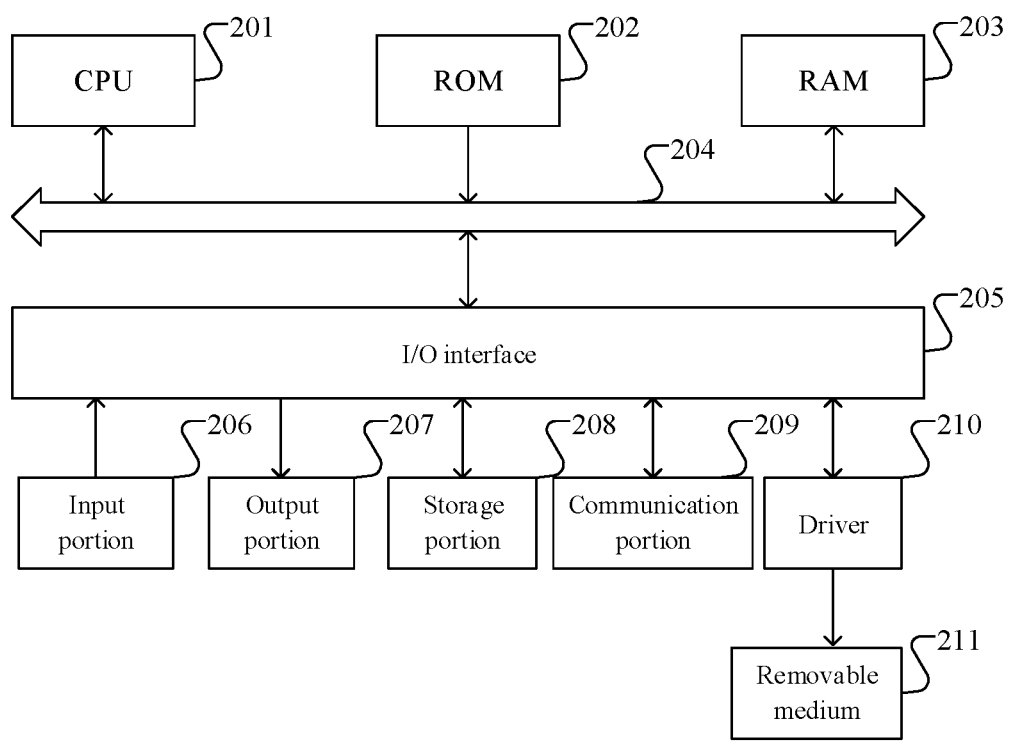
FIG. 2 illustrates a schematic structure diagram of an electronic device according to some embodiments of the present disclosure.

FIG. 2 illustrates a schematic diagram of a structure of a computer system suitable for implementing an electronic device according to an embodiment of the present disclosure.

It should be noted that the computer system 200 of the electronic device illustrated in FIG. 2 is only an example, which should not constitute any limitation on the function and use scope of the embodiment of the present disclosure.

As shown in FIG. 2, the computer system 200 includes a central processing unit (CPU) 201 which may perform various appropriate actions and processes according to a program stored in a read-only memory (ROM) 202 or loaded from a storage portion 208 into a random access memory (RAM) 203. Various programs and data required for system operation are also stored in the RAM 203. The CPU 201, ROM 202, and RAM 203 are connected to each other via a bus 204. An input/output (I/O) interface 205 is also connected to the bus 204. The following components are connected to the I/O interface 205: an input portion 206 including a keyboard, a mouse, etc.; an output portion 207 including a cathode ray tube (CRT), a liquid crystal display (LCD), a speaker, etc.; a storage portion 208 including a hard disk, etc.; and a communication portion 209 including a network interface card such as a LAN card, a modem, etc. The communication portion 209 performs communication processing via a network such as the Internet. A driver 210 is also connected to the I/O interface 205 as needed. A removable media 211, such as a magnetic disk, a compact disc, a photomagnetic disk, and a semiconductor memory, is mounted on the driver 210 as needed, so that computer programs read therefrom are mounted into the storage portion 208 as needed.

In particular, according to an embodiment of the present disclosure, the process described below with reference to the flowchart may be implemented as a computer software program. For example, an embodiment of the present disclosure includes a computer program product including a computer program carried on a computer readable medium, and the computer program includes program codes for performing the method shown in the flowchart. In such an embodiment, the computer program may be downloaded and installed from a network via the communication portion 209, and/or installed from the removable medium 211. Upon execution of the computer program by the central processing unit (CPU) 201, various functions defined in the methods and devices of the present disclosure are performed.

Figure 3:
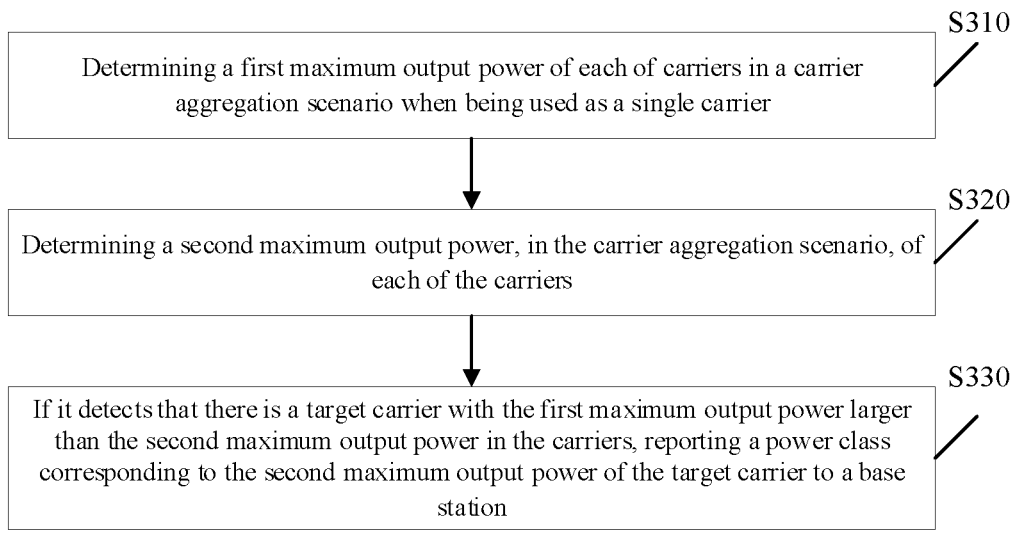
FIG. 3 schematically illustrates a flowchart of a method for reporting information based on carrier aggregation according to some embodiments of the present disclosure.

An example embodiment provides a method for reporting information based on carrier aggregation. The method for reporting information based on carrier aggregation may be applied to the above-described server 105, or to one or more of the above-described terminal devices 101, 102, 103, which is not specifically limited in the example embodiment. Referring to FIG. 3, the method for reporting information based on carrier aggregation may include:

step S310, determining a first maximum output power of each of carriers in a carrier aggregation scenario when being used as a single carrier;

step S320, determining a second maximum output power, in the carrier aggregation scenario, of each of the carriers; and step S330, if it detects that there is a target carrier with the first maximum output power larger than the second maximum output power in the carrier aggregation scenario, reporting a power class corresponding to the second maximum output power of the target carrier to a base station.

There is the target carrier with the first maximum output power larger than the second maximum output power in the carrier aggregation scenario, which means that there is the target carrier with the first maximum output power larger than the second maximum output power in the carriers.

It can be seen that in the implementation of the method shown in FIG. 3, for each carrier in the carrier aggregation scenario, when the maximum output power of a carrier when being used as a single carrier is larger than the maximum output power in the carrier aggregation scenario of this carrier, the actual maximum output power class of this carrier in the carrier aggregation scenario may be reported to the base station in a timely manner, so as to ensure that there is consistency between the maximum output power class of each carrier stored in the base station and the actual maximum output power class of each carrier in the terminal, which can facilitate more effective information transmission.

Below, the above steps of the present example embodiment are described in more detail.

In step S310, a first maximum output power of each of carriers in a carrier aggregation scenario when being used as a single carrier is determined. The carrier aggregation (CA) is to aggregate a plurality of carriers with different/identical frequencies into a wider spectrum, and it may also aggregate discontinuous spectrum fragmentations to achieve an increase in bandwidth. In addition, the carrier mentioned above may also be denoted as a frequency band. In the carrier aggregation scenario, the carriers are intra-band contiguous, intra-band non-contiguous or inter-band non-contiguous. In addition, the first maximum output power may characterize a maximum output power that can be used when data is transmitted or received over a single carrier, and if a terminal device corresponds to a plurality of single carriers, each of the single carriers may correspond to one first maximum output power.

In step S320, a second maximum output power, in the carrier aggregation scenario, of each of the carriers is determined. The second maximum output power may characterize a maximum output power that can be used when data is transmitted or received over each of the carriers in the carrier aggregation.

In some embodiments, the above method further includes: reassigning transmitting channels corresponding to the carriers when receiving a carrier assignment instruction, so that the transmitting channels correspond to the carriers in a one-to-one correspondence; and performing carrier aggregation on the carriers and determining that the carriers are in the carrier aggregation scenario.

The carrier assignment instruction may be used to instruct the terminal device to reassign the transmitting channels that can be used by the carriers, and the corresponding transmitting channel of the terminal device may be one or more, which is not limited in the embodiment of the present disclosure. When the terminal device corresponds to a plurality of transmitting channels, in the carrier aggregation scenario, one carrier corresponds to one transmitting channel, and in a single carrier scenario, one carrier may correspond to one or more transmitting channels. In the single carrier scenario, the terminal device may correspond to one or more carriers.

It can be seen that in the implementation of the above optional embodiment, a plurality of carriers can be aggregated to achieve the effect of increasing the bandwidth.

Figure 4:
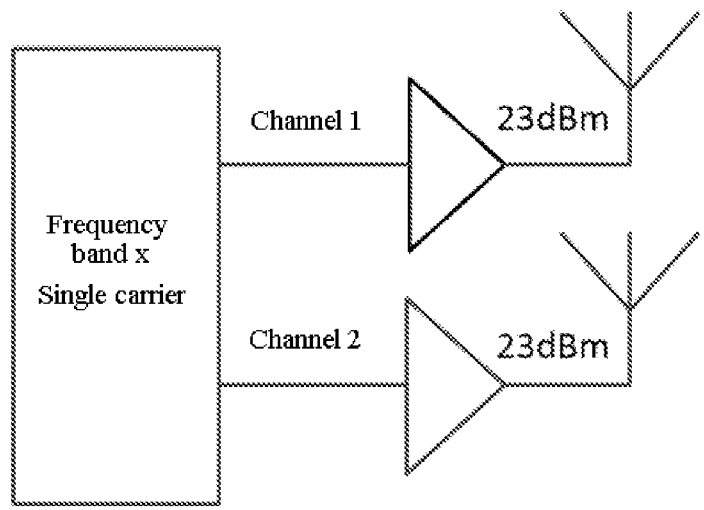
FIG. 4 schematically illustrates a schematic diagram of a single carrier scenario according to some embodiments of the present disclosure.

Before the carrier aggregation, the carrier in the terminal device may transmit data via a plurality of channels. With specific reference to FIG. 4, FIG. 4 schematically illustrates a schematic diagram of a single carrier scenario according to some embodiments of the present disclosure. As shown in FIG. 4, in the single carrier scenario, the terminal device includes a frequency band x as a single carrier, the frequency band x may use both channel 1 and channel 2 in the terminal device to send and receive signals, each of the maximum output powers corresponding to channel 1 and channel 2 respectively is 23 dBm, and the first maximum output power of the frequency band x when being used as a single carrier may be 26 dBm by superimposing the maximum output powers of the channel 1 and the channel 2.

Figure 5:
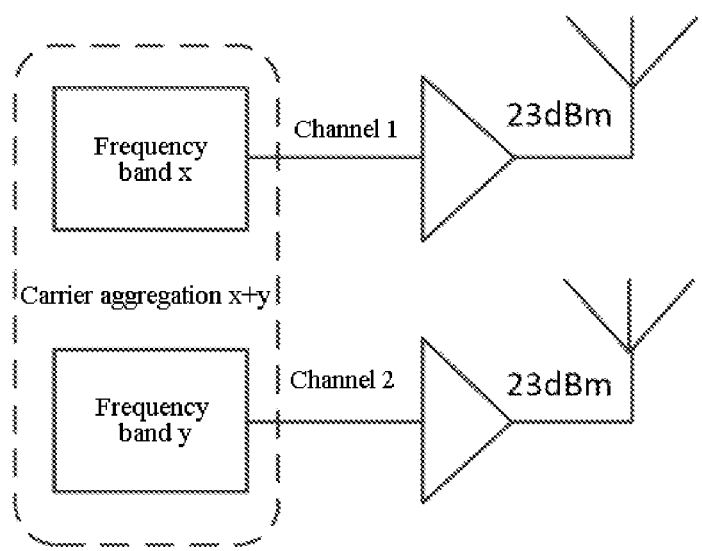
FIG. 5 schematically illustrates a schematic diagram of a carrier aggregation scenario according to some embodiments of the present disclosure.

After the carrier aggregation, the plurality of carriers in the terminal device may respectively transmit data through respective corresponding channels thereto. As shown in FIG. 5, FIG. 5 schematically illustrates a schematic diagram of a carrier aggregation scenario according to some embodiments of the present disclosure. As shown in FIG. 5, in the carrier aggregation scenario, the terminal device includes a frequency band x and a frequency band y of the carrier aggregation, and based on the reassignment of channels by the terminal device, the frequency band x and the frequency band y correspond to the channel 1 and the channel 2, respectively, and then the frequency band x and the frequency band y correspond to the second maximum output power of 23 dBm, respectively.

For example, the terminal device corresponds to the carrier x and the carrier y. The maximum output power of each of the carrier x and the carrier y when being used as a single carrier may be 23 dBm or 26 dBm. Although the maximum output power after the carrier aggregation may reach 26 dBm, each of the output powers of the carrier x and the carrier y in the carrier aggregation may not necessarily reach 26 dBm when transmitting information through the respective corresponding channels thereto. That is, when the maximum output power after the carrier aggregation is 26 dBm, the maximum output powers corresponding to the carrier x and carrier y may be [23 dBm, 23 dBm], [23 dBm, 26 dBm], [26 dBm, 23 dBm], [26 dBm, 26 dBm]. The above example may also be represented by the following table:

| Case | Maximum output power after carrier aggregation | Maximum output power of carrier X | Maximum output power of carrier Y |
| --- | --- | --- | --- |
| 1 | 26 dBm | 23 dBm | 23 dBm |
| 2 | 26 dBm | 23 dBm | 26 dBm |
| 3 | 26 dBm | 26 dBm | 23 dBm |
| 4 | 26 dBm | 26 dBm | 26 dBm |

In step S330, if it detects that there is a target carrier with the first maximum output power larger than the second maximum output power in the carrier aggregation scenario, a power class corresponding to the second maximum output power of the target carrier is reported to a base station.

The base station may be at least one of a 3G base station, a 4G base station, a 5G base station, and a 6G base station, which is not limited in the embodiments of the present disclosure. Furthermore, there may be one or more target carriers. In addition, the power class may be used to characterize information transmitting and receiving capability of the terminal device (e.g., a user equipment (UE)), and the power class is included in the capability information of the terminal device. Specifically, the capability information of the terminal device may include information indicative of a radio access technology supported by the terminal device, for example, a power class, a frequency band, a carrier aggregation (CA) band combination, a duplex mode, a service profile, a radio bearer, and the like, supported by the terminal device. The duplex mode includes time division duplexing (TDD) and frequency division duplexing (FDD). In the TDD, a common RF frequency point is used in transmitting information and receiving information, and the uplink and downlink use different time slots for communication. In the FDD, different RF frequency points are used in transmitting information and receiving information respectively. The terminal device in the present disclosure may use the above TDD mode described above.

In some embodiments, reporting the power class corresponding to the second maximum output power of the target carrier to the base station includes: generating first indication information including a carrier identification field and a power class field, wherein the carrier identification field is configured to indicate at least an identification corresponding to the target carrier, and the power class field is configured to indicate at least the power class corresponding to the second maximum output power of the target carrier; and transmitting the first indication information to the base station.

The carrier identification field may be denoted as CA-BandNR, and the power class field may be denoted as PowerClass. The power class field may indicate whether the power class corresponding to each carrier in the carrier aggregation scenario when being used as a single carrier is applicable to the carrier aggregation scenario. Further, the first indication information may be generated by the UE capability information element in the terminal device.

For example, the first indication information may be expressed as follows:

power of the target carrier to the power class corresponding to the second maximum output power of the target carrier.

The base station may be used to store the first maximum output power class of each carrier in each terminal device accessed. For example, the power class corresponding to the first maximum output power may be expressed as (Power Class 2, +26 dBm), i.e., the power class is 2; and the power class corresponding to the second maximum output power may be expressed as (Power Class 3, +23 dBm) i.e., the power class is 3.

It can be seen that in the implementation of the above optional embodiment, the power class can be adjusted accurately.

In some embodiments, if it detects that there is no target carrier with the first maximum output power larger than the second maximum output power in the carriers, second indication information including the carrier identification field is reported. The second indication information is transmitted to the base station, so that the base station determines, when detecting that there is a default field in the second indication information, that there is no power class update indication.

The default field may be understood to mean that the second indication information does not include the carrier identification field or the power class field. The second indication information is transmitted in the same manner as that in which the first indication information is transmitted.

It can be seen that in the implementation of the above optional embodiment, accurate indication information can be sent to the base station without power class adjustment.

In some embodiments, reporting the power class corresponding to the second maximum output power of the target carrier to the base station includes: determining at least one cell to which a terminal device belongs, and determining a base station corresponding to each of the at least one cell; and reporting the power class corresponding to the second maximum output power of the target carrier to the base station corresponding to each of the at least one cell.

If there are a plurality of cells to which the terminal device belongs, the coverage capacities of the plurality of cells may be the same or different, and coverage areas of the plurality of cells may be overlapped. The cell to which the terminal device belongs may characterize the coverage area of the base station.

```
BandParameters: : =
nr                           SEQUENCE{
bandNR                          FreqBandIndicatorNR,
ca-BandwidthClassDL-NR          CA-BandwidthClassNR       OPTIONAL,
ca-BandwidthClassUL-NR          CA-BandwidthClassNR       OPTIONAL,
CA-BandNR-PowerClass            ENUMERATED {pc1, pc1.5, pc2, pc3, pc5}
OPTIONAL
}
```

It is to be noted that the above parameters may be applied in an inter-compatible scenario of 4G and 5G dual connectivity.

It can be seen that in the implementation of the above optional embodiments, the base station may be provided with accurate indication information, so that the base station can accurately adjust the carrier power class according to the indication information.

In some embodiments, after transmitting the first indication information to the base station, the base station updates the power class corresponding to the first maximum output It can be seen that in the implementation of the above optional embodiment, the timeliness of reporting the power class reporting to the cell to which the terminal device belongs can be ensured.

In some embodiments, after it is switched to the carrier aggregation scenario, when there is uplink data, the uplink data is uploaded to the base station via the target carrier at an output power less than or equal to the second maximum output power of the target carrier. The uplink data may be data that the terminal device needs to send to the base station.

It can be seen that in the implementation of the above optional embodiment, the accuracy of the power adjustment of the terminal device by the base station can be improved.

Figure 6:
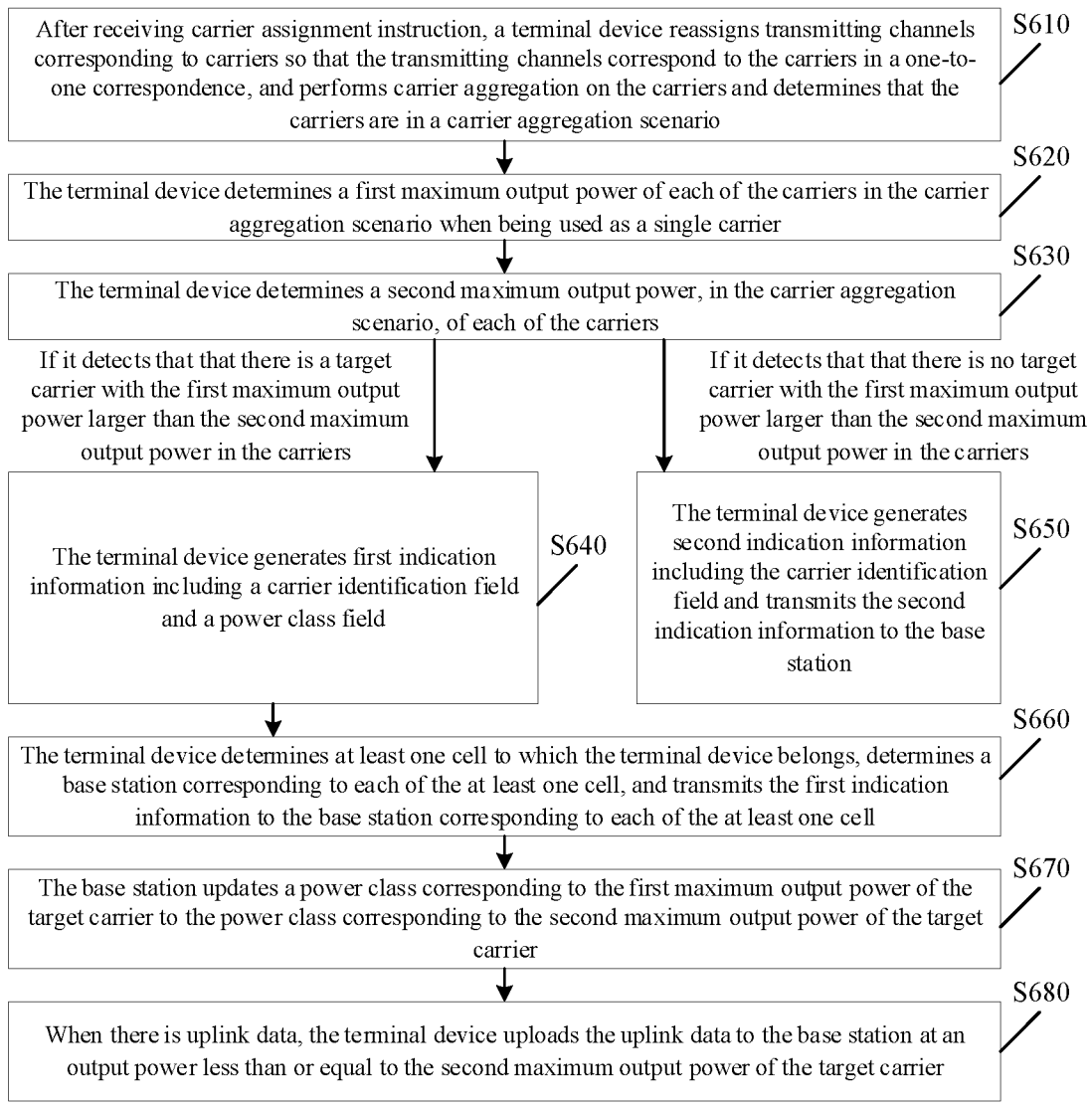
FIG. 6 schematically illustrates a flowchart of a method for reporting information based on carrier aggregation according to some other embodiments of the present disclosure.

Furthermore, in some embodiments, the steps shown in FIG. 3 and embodiments thereof are integrated, which is shown as the method for reporting information based on carrier aggregation in FIG. 6, and the method specifically includes step S610 to S680.

In step S610, after receiving a carrier assignment instruction, a terminal device reassigns transmitting channels corresponding to carriers so that the transmitting channels correspond to the carriers in a one-to-one correspondence, and performs carrier aggregation on the carriers and determines that the carriers are in a carrier aggregation scenario.

In step S620, the terminal device determines a first maximum output power of each of the carriers in the carrier aggregation scenario when being used as a single carrier.

In step S630, the terminal device determines a second maximum output power, in the carrier aggregation scenario, of each of the carriers. If it detects that that there is a target carrier with the first maximum output power larger than the second maximum output power in the carrier aggregation scenario, step S640 is performed. If it detects that that there is no target carrier with the first maximum output power larger than the second maximum output power in the carrier aggregation scenario, step S650 is performed.

In step S640, the terminal device generates first indication information including a carrier identification field and a power class field, wherein the carrier identification field is configured to indicate at least an identification corresponding to the target carrier, and the power class field is configured to indicate at least the power class corresponding to the second maximum output power of the target carrier.

In step S650, the terminal device generates second indication information including the carrier identification field and transmits the second indication information to the base station, so that the base station determines that there is no power class update indication when detecting that there is a default field in the second indication information. Further, the process is ended.

In step S660, the terminal device determines at least one cell to which the terminal device belongs, determines a base station corresponding to each of the at least one cell, and transmits the first indication information to the base station corresponding to each of the at least one cell.

In step S670, the base station updates a power class corresponding to the first maximum output power of the target carrier to the power class corresponding to the second maximum output power of the target carrier.

In step S680, when there is uplink data, the terminal device uploads the uplink data to the base station at an output power less than or equal to the second maximum output power of the target carrier.

It is to be noted that steps S610 to S680 correspond to the steps shown in FIG. 3 and the embodiments thereof. For the specific implementation of steps S610 to S680, please refer to the steps shown in FIG. 3 and the embodiments thereof, which will not be repeated herein.

It can be seen that in the implementation of the method shown in FIG. 6, when the maximum output power of each carrier in the carrier aggregation when being used as a single carrier is larger than the maximum output power in the carrier aggregation scenario, the actual maximum output power class of the carrier in the carrier aggregation may be reported to the base station in a timely manner, so as to ensure that there is consistency between the maximum output power class of the carrier stored in the base station and the actual maximum output power class of the carrier in the terminal, which can facilitate more effective information transmission.

Further, an example embodiment further provides a device for reporting information based on carrier aggregation. Referring to a device for reporting information based on carrier aggregation 700 shown in FIG. 7, the device for reporting information based on carrier aggregation 700 corresponds to the steps shown in FIG. 3, and the device for reporting information based on carrier aggregation 700 may include:

a power determining unit 701, configured to determine a first maximum output power of each of carriers in a carrier aggregation scenario when being used as a single carrier;

the power determining unit 701, further configured to determine a second maximum output power, in the carrier aggregation scenario, of each of the carriers; and an information reporting unit 702, configured to report, in response to detecting that there is a target carrier with the first maximum output power larger than the second maximum output power in the carrier aggregation scenario, a power class corresponding to the second maximum output power of the target carrier to a base station.

The carriers are intra-band contiguous, intra-band non-contiguous or inter-band non-contiguous.

Figure 7:
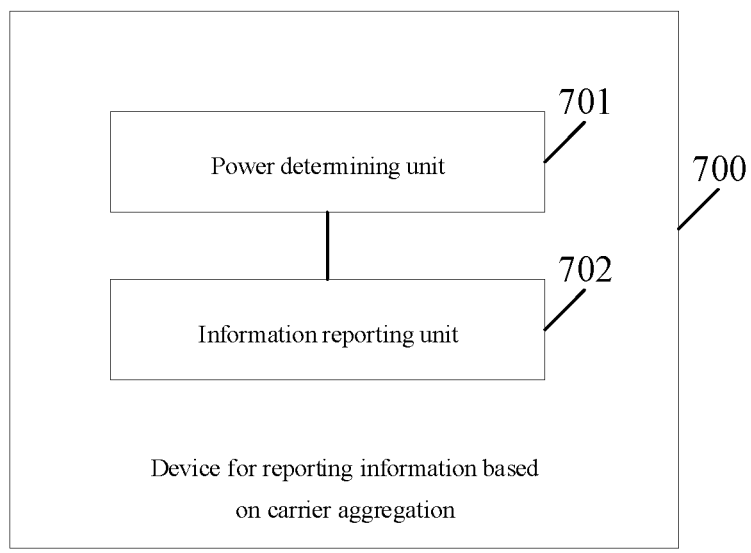
FIG. 7 schematically illustrates a structure block diagram of a device for reporting information based on carrier aggregation according to some embodiments of the present disclosure.

It can be seen that in the implementation of the device shown in FIG. 7, when the maximum output power of each carrier in the carrier aggregation when being used as a single carrier is larger than the maximum output power in the carrier aggregation scenario, the actual maximum output power class of the carrier in the carrier aggregation may be reported to the base station in a timely manner, so as to ensure that there is consistency between the maximum output power class of the carrier stored in the base station and the actual maximum output power class of the carrier in the terminal, which can facilitate more effective information transmission.

In some embodiments, the information reporting unit 702 is configured to: generate first indication information including a carrier identification field and a power class field, wherein the carrier identification field is configured to indicate at least an identification corresponding to the target carrier, and the power class field is configured to indicate at least the power class corresponding to the second maximum output power of the target carrier; and transmit the first indication information to the base station.

It can be seen that in the implementation of the above optional embodiment, the base station may be provided with accurate indication information, so that the base station can accurately adjust the carrier power class based on the indication information.

In some embodiments, after the information reporting unit 702 transmits the first indication information to the base station, the base station updates a power class corresponding to the first maximum output power of the target carrier to the power class corresponding to the second maximum output power of the target carrier.

It can be seen that in the implementation of the above optional embodiment, the power class can be accurately adjusted.

In some embodiments, the information reporting unit 702 is further configured to: report second indication information including the carrier identification field when detecting that there is no target carrier with the first maximum output power larger than the second maximum output power in the carrier aggregation; and transmit the second indication information to the base station, so that the base station determines that there is no power class update indication when detecting that there is a default field in the second indication information.

It can be seen that in the implementation of the above optional embodiment, accurate indication information can be sent to the base station without the power class adjustment.

In some embodiments, the above-described device further includes:

a channel assigning unit (not shown), configured to reassign transmitting channels corresponding to the carriers when receiving a carrier assignment instruction, so that the transmitting channels correspond to the carriers in a one-to-one correspondence; and perform carrier aggregation on the carriers and determine that the carriers are in the carrier aggregation scenario.

It can be seen that in the implementation of the above optional embodiment, a plurality of carriers can be aggregated to achieve the effect of increasing the bandwidth.

In some embodiments, after switching to the carrier aggregation scenario, the above-described device further includes:

a data uploading unit (not shown), configured to upload the uplink data to the base station at an output power less than or equal to the second maximum output power of the target carrier when there is uplink data.

It can be seen that in the implementation of the above optional embodiment, the accuracy of the power adjustment of the terminal device by the base station can be improved.

In some embodiments, the information reporting unit 702 is configured to:

determine at least one cell to which a terminal device belongs, and determine a base station corresponding to each of the at least one cell; and report the power class corresponding to the second maximum output power of the target carrier to the base station corresponding to each of the at least one cell.

It can be seen that in the implementation of the above optional embodiment, the timeliness of reporting the power class to the cell to which it belongs can be ensured.

It should be noted that although several modules or units of the device for action execution are mentioned in the detailed description above, such division is not mandatory. Indeed, according to an embodiment of the present disclosure, the features and functions of two or more modules or units described above may be specified in a single module or unit. Conversely, the feature and function of one module or unit described above may be further divided to be specified by more than one module or unit.

Since various functional modules of the device for reporting information based on carrier aggregation in the example embodiment of the present disclosure correspond to the steps of the method for reporting information based on carrier aggregation in above-described example embodiment, the details not disclosed in the device embodiment of the present disclosure may refer to the above-described embodiment of the method for reporting information based on carrier aggregation of the present disclosure.

According to another aspect, the present disclosure also provides a computer-readable medium, which may be included in the electronic device described in the above embodiment, or may be present separately without being assembled into the electronic device. The computer-readable medium described above carries one or more programs that, when being executed by one such electronic device, cause the electronic device to implement the method described in the above embodiments.

The embodiments of the present disclosure may have some or all of the following beneficial effects.

In the method for reporting information based on carrier aggregation of the present disclosure, it may determine a first maximum output power of each carrier in a carrier aggregation scenario when being used as a single carrier; determine a second maximum output power, in the carrier aggregation scenario, of each carrier; and report, in response to detecting that there is a target carrier with the first maximum output power larger than the second maximum output power in the carrier aggregation scenario, a power class corresponding to the second maximum output power of the target carrier to a base station. Based on the above scheme, in the present disclosure, when the maximum output power of each carrier in the carrier aggregation when being used as a single carrier is larger than the maximum output power in the carrier aggregation scenario, the actual maximum output power class of the carrier in the carrier aggregation may be reported to the base station in a timely manner, so as to ensure that there is consistency between the maximum output power class of the carrier stored in the base station and the actual maximum output power class of the carrier in the terminal, which can facilitate more effective information transmission. It is to be noted that the computer-readable medium shown in the present disclosure may be a computer-readable signal medium or a computer-readable storage medium or any combination thereof. The computer-readable storage medium may be, but is not limited to, for example a system, device, or apparatus of electricity, magnetism, light, electromagnetism, infrared ray, or semiconductors, or any combination thereof. The specific example of computer-readable storage media may include, but is not limited to, an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic memory device, or any suitable combination thereof. In the present disclosure, the computer-readable storage medium may be any tangible medium including or storing programs that may be used by or in combination with an instruction execution system, apparatus or device. And in the present disclosure, the computer-readable signal medium may include a data signal propagated in baseband or as part of a carrier carrying computer-readable program codes. Such propagated data signal may take a variety of forms, including, but not limited to, electromagnetic signal, optical signal, or any suitable combination thereof. The computer-readable signal medium may also be any computer-readable medium other than the computer-readable storage medium that sends, propagates or transmits programs for use by, or in combination with, an instruction-executing system, apparatus or device. The program code included on the computer-readable medium may be transmitted using any suitable medium including, but not limited to, wireless, wire, optical cable, RF, etc., or any suitable combination thereof.

The flowchart and block diagram in the accompanying drawings illustrate the architecture, functionality, and operation of systems, methods, and computer program products that may be implemented in accordance with various embodiments of the present disclosure. In this regard, each block in the flowcharts or block diagrams may represent a module, program segment, or portion of code which includes one or more executable instructions for implementing the specified logical functions. It should also be noted that in some implementations as replacements, the functions indicated in the blocks may also occur in a different order than that indicated in the accompanying drawings. For example, two blocks consecutively represented can actually be executed substantially in parallel, and they can sometimes be executed in reverse order, which depends on the function involved. It should also be noted that each block and block combination in the block diagram or flowchart may be implemented with a dedicated hardware-based system that performs the specified function or operation, or may be implemented with a combination of dedicated hardware and computer instructions.

The unit described and involved in the embodiment of the present disclosure may be implemented by means of software or hardware or provided in a processor. The names of the units do not constitute a limitation on the unit itself in some cases.

A person skilled in the art may easily conceive of other embodiments of the present disclosure upon consideration of the specification and practice of the invention disclosed herein. The present disclosure is intended to cover any variations, uses, or adaptations of the present application that follow the general principle of the present disclosure and include the conventional technical means and the common knowledge in the art not disclosed herein. The specification and embodiments are to be regarded as exemplary only, and the true scope and spirit of the present disclosure is indicated by the following claims.

It is to be understood that the present disclosure is not limited to the precise structure which has been described above and illustrated in the accompanying drawings, and that various modifications and changes may be made without departing from the scope thereof. The scope of the present application is limited only by the appended claims.

What is claimed is:

1. A method for reporting information based on carrier aggregation, comprising:
    determining a first maximum output power supported by each of a plurality of carriers when being used as a single carrier;
    determining a second maximum output power, in a carrier aggregation scenario, supported by each of the carriers; and
    reporting, in response to detecting that there is a target carrier with the first maximum output power larger supported than the second maximum output power supported in the carrier aggregation scenario, a power class corresponding to the second maximum output power supported by the target carrier to a base station.

2. The method according to claim 1, wherein reporting the power class corresponding to the second maximum output power supported by the target carrier to the base station comprises:
    generating first indication information comprising a carrier identification field and a power class field, wherein the carrier identification field is configured to indicate at least an identification corresponding to the target carrier, and the power class field is configured to indicate at least the power class corresponding to the second maximum output power supported by the target carrier; and
    transmitting the first indication information to the base station.

3. The method according to claim 2, wherein the first indication information is transmitted to the base station, so that the base station updates, according to first indication information, a power class corresponding to the first maximum output power supported by the target carrier to the power class corresponding to the second maximum output power supported by the target carrier.

4. The method according to claim 2, further comprising:
    reporting, in response to detecting that there is no target carrier with the first maximum output power larger supported than the second maximum output power supported in the carrier aggregation scenario, second indication information comprising the carrier identification field; and
    transmitting the second indication information to the base station, so that the base station determines, in response to detecting that there is a default field in the second indication information, that there is no power class update indication.

5. The method according to claim 1, further comprising:
    reassigning, in response to receiving a carrier assignment instruction, transmitting channels corresponding to the carriers, so that the transmitting channels correspond to the carriers in a one-to-one correspondence; and
    performing carrier aggregation on the carriers and determining that the carriers are in the carrier aggregation scenario.

6. The method according to claim 1, further comprising, after switching to the carrier aggregation scenario, uploading, in response to determining that there is uplink data, the uplink data to the base station at an output power less than or equal to the second maximum output power supported by the target carrier.

7. The method according to claim 1, wherein the carriers are intra-band contiguous, intra-band non-contiguous or inter-band non-contiguous.

8. The method according to claim 1, wherein reporting the power class corresponding to the second maximum output power supported by the target carrier to the base station comprises:
    determining at least one cell to which a terminal device belongs, and determining a base station corresponding to each of the at least one cell; and
    reporting the power class corresponding to the second maximum output power supported by the target carrier to the base station corresponding to each of the at least one cell.

9. The method according to claim 1, further comprising transmitting, in response to detecting that there is no target carrier with the first maximum output power larger supported than the second maximum output power supported in the carrier aggregation scenario, third indication information to the base station, wherein the third indication information does not comprise a carrier identification field or a power class field.

10. The method according to claim 9, wherein the third indication information is transmitted to the base station, so that the base station determines not to update the power classes corresponding to the carriers according to the third indication information.

11. The method according to claim 1, wherein in the carrier aggregation scenario, each of the carriers corresponds to one transmitting channel, and in a single carrier scenario, each of the carriers corresponds to one or more transmitting channels.

12. The method according to claim 1, wherein the base station is at least one of a 3G base station, a 4G base station, a 5G base station, and a 6G base station.

13. The method according to claim 1, wherein a terminal device transmitting the carriers applies a time division duplex TDD mode.

14. The method according to claim 1, wherein the carrier aggregation scenario comprises a carrier aggregation scenario in 4G and 5G dual connectivity.

15. A non-transitory computer-readable storage medium having computer programs stored thereon that, when being executed by at least one processor, causes the at least one processor to implement:
- determining a first maximum output power supported by each of a plurality of carriers when being used as a single carrier;
- determining a second maximum output power, in a carrier aggregation scenario, supported by each of the carriers; and
- reporting, in response to detecting that there is a target carrier with the first maximum output power larger supported than the second maximum output power supported in the carrier aggregation scenario, a power class corresponding to the second maximum output power supported by the target carrier to a base station.

16. A device for reporting information based on carrier aggregation, comprising:
- at least one hardware processor; and
- a memory for storing program instructions that are executable by the at least one hardware processor, wherein the program instructions, when being executed by the at least one hardware processor, direct the at least one processor to implement:
  - determining a first maximum output power supported by each of a plurality of carriers when being used as a single carrier;
  - determining a second maximum output power, in a carrier aggregation scenario, supported by each of the carriers; and
  - reporting, in response to detecting that there is a target carrier with the first maximum output power larger supported than the second maximum output power supported in the carrier aggregation scenario, a power class corresponding to the second maximum output power supported by the target carrier to a base station.

17. The device according to claim 16, wherein reporting the power class corresponding to the second maximum output power supported by the target carrier to the base station comprises:
- generating first indication information comprising a carrier identification field and a power class field, wherein the carrier identification field is configured to indicate at least an identification corresponding to the target carrier, and the power class field is configured to indicate at least the power class corresponding to the second maximum output power supported by the target carrier; and
- transmitting the first indication information to the base station.

18. The device according to claim 17, wherein the first indication information is transmitted to the base station, so that the base station updates, according to first indication information, a power class corresponding to the first maximum output power supported by the target carrier to the power class corresponding to the second maximum output power supported by the target carrier.

19. The device according to claim 17, wherein the at least one hardware processor is directed to further implement:
- reporting, in response to detecting that there is no target carrier with the first maximum output power larger supported than the second maximum output power supported in the carrier aggregation scenario, second indication information comprising the carrier identification field; and
- transmitting the second indication information to the base station, so that the base station determines, in response to detecting that there is a default field in the second indication information, that there is no power class update indication.

20. The device according to claim 16, wherein the at least one hardware processor is directed to further implement:
- reassigning, in response to receiving a carrier assignment instruction, transmitting channels corresponding to the carriers, so that the transmitting channels correspond to the carriers in a one-to-one correspondence; and
- performing carrier aggregation on the carriers and determining that the carriers are in the carrier aggregation scenario.

* * * * *